United States Patent
Vezza et al.

(10) Patent No.: US 7,620,390 B2
(45) Date of Patent: Nov. 17, 2009

(54) ESTABLISHING A CALL SESSION DURING AN ADVERTISEMENT TIME PERIOD

(75) Inventors: Brian D. Vezza, Allen, TX (US); Dominic J. Goodwill, Kanata (CA); Alan F. Graves, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 475 days.

(21) Appl. No.: 11/438,565

(22) Filed: May 22, 2006

(65) Prior Publication Data
US 2007/0271137 A1 Nov. 22, 2007

(51) Int. Cl.
*H04M 3/42* (2006.01)

(52) U.S. Cl. .............. 455/414.1; 455/414.3; 455/414.4; 455/3.06; 455/552.1; 455/466; 370/329; 370/330; 370/336; 370/337; 370/338; 379/67.1; 705/1; 705/10; 705/14; 705/26; 705/27; 725/32; 725/34; 725/35; 725/36; 725/135

(58) Field of Classification Search ... 455/414.1–414.4, 455/3.01, 3.02, 3.06, 417, 3.04, 466, 552.1; 370/352, 493, 494, 495, 498, 214, 329, 330, 370/336, 337, 338, 347, 348, 389–392, 395.2, 370/535–537; 379/88.22, 67.1, 67, 70, 114.13, 379/142.01, 76, 88.11, 88.25; 709/223–229; 725/32, 34, 35, 36, 135; 705/1, 10, 14, 26, 705/27

See application file for complete search history.

(56) References Cited

U.S. PATENT DOCUMENTS

| 6,937,699 | B1 * | 8/2005 | Schuster et al. ............ 379/67.1 |
| 7,130,392 | B2 * | 10/2006 | Morton .................... 379/88.25 |
| 7,203,684 | B2 * | 4/2007 | Carobus et al. ............... 707/10 |
| 7,440,749 | B2 * | 10/2008 | Muto ....................... 455/414.1 |
| 2003/0027556 | A1 * | 2/2003 | Kobayashi .................. 455/414 |
| 2003/0156687 | A1 * | 8/2003 | Messager ................... 379/67.1 |
| 2005/0039205 | A1 * | 2/2005 | Riedl .......................... 725/32 |
| 2005/0083976 | A1 * | 4/2005 | Ashley et al. ................ 370/537 |
| 2007/0039020 | A1 * | 2/2007 | Cansler et al. ................ 725/37 |
| 2007/0066287 | A1 * | 3/2007 | Papulov ................... 455/414.1 |
| 2007/0130012 | A1 * | 6/2007 | Yruski et al. ................. 705/14 |
| 2007/0255617 | A1 * | 11/2007 | Maurone et al. .............. 705/14 |

OTHER PUBLICATIONS

DARPA Internet Program, RFC 791, "Internet Protocol," pp. 1-45 (Sep. 1981).
R. Braden, Network Working Group, RFC 2205, "Resource Reservation Protocol (RSVP)—Version 1 Functional Specification," pp. 1-112 (Sep. 1997).

(Continued)

*Primary Examiner*—Charles N Appiah
*Assistant Examiner*—Olumide T Ajibade Akonai
(74) *Attorney, Agent, or Firm*—Trop Pruner & Hu, P.C.

(57) ABSTRACT

To communicate between terminal devices, a time period of overlap between a first time slot of first advertisement content provided to a first terminal device and a second time slot of second advertisement content provided to a second terminal device is determined. An indication is sent for establishment of a call session between the first terminal device and second terminal device during the time period of overlap.

18 Claims, 4 Drawing Sheets

OTHER PUBLICATIONS

S. Deering, Network Working Group, RFC 2460, "Internet Protocol, Version 6 (IPv6) Specification," pp. 1- 39 (Dec. 1998).

J. Rosenberg et al., Network Working Group, RFC 3261, "SIP: Session Initiation Protocol," pp. 1-269 (Jun. 2002).

* cited by examiner

ESTABLISHING A CALL SESSION DURING AN ADVERTISEMENT TIME PERIOD

TECHNICAL FIELD

This invention relates generally to establishing a call session between terminal devices during a time period in which advertisement content is to be provided to the terminal devices.

BACKGROUND

With the advent of digital television content, greater flexibility is available to service providers as well as users. Traditionally, television content has been provided by satellite or cable providers. However, Internet Protocol television (IPTV) has been proposed to allow other service providers (such as telephone companies) to provide television content to users. IPTV involves the transmission of television content over IP networks using broadband connections to customer premise equipment, which include set-top boxes, digital video recorders (DVRs), and so forth.

Viewers often tend to ignore advertisements that are periodically presented during television broadcasts. If the viewers are not interested in a particular television advertisement, then the time period during which such television advertisement is being displayed is wasted time (at least from the viewer's standpoint). From the service provider's standpoint, viewers not paying attention to television advertisements may result in revenue loss, particularly if advertisement revenue is based on some activity generated from the particular television advertisement.

SUMMARY

In general, methods and apparatus are provided to allow call sessions to be established during time periods in which advertisement content is to be provided to terminal devices.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
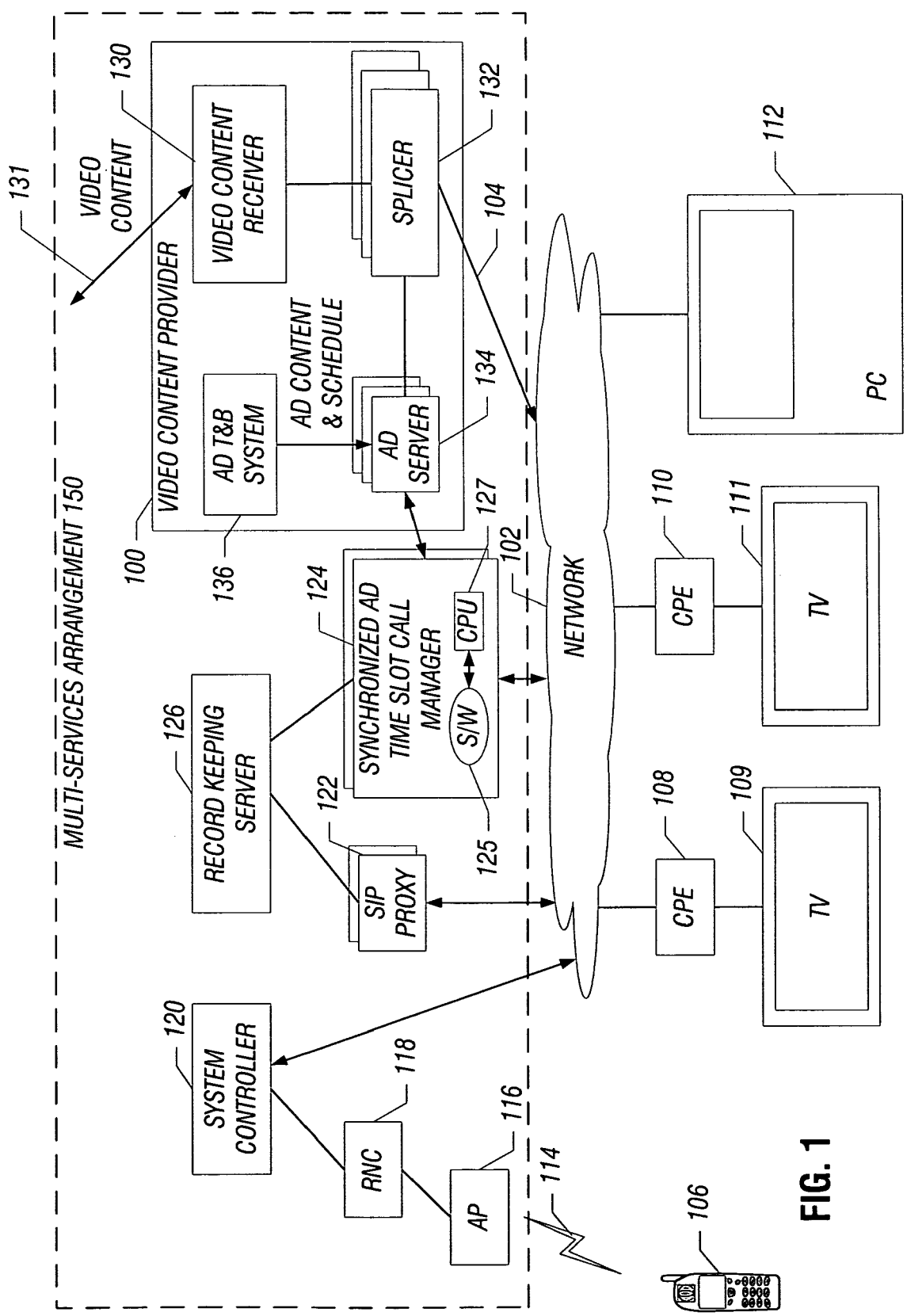
FIG. 1 is a block diagram of an example communications network that incorporates an embodiment of the invention.

FIG. 1 illustrates various examples of terminal devices, at least some of which are able to receive video content (such as television content) from a video content provider 100. Although reference is made to a video content provider 100 that provides video content, it is contemplated that other embodiments of the invention can be applied to other types of information content, such as audio content or other multimedia content. More generally, the term "information content" refers to any one of various types of information that can be presented to a terminal device, with examples of the information content including video content, multimedia content, text data, and so forth. The information content can be provided to a terminal device in a streaming fashion from the video content provider 100 (or from another type of information content provider), where the streaming information content is provided in real time (or substantially in real time) over a network 102 to the terminal device. Alternatively, the information content can be first downloaded to a terminal device for storage in the terminal device (e.g., a digital video recorder), with the downloaded information content subsequently presented to a user.

In the ensuing discussion, reference is made to video content, and in particular, to television content. However, note that in other embodiments of the invention, the same or similar techniques can be applied to other types of information content provided by an information content provider to terminal devices.

The video content provided by the video content provider 100 to a terminal device over the network 102 includes video content with advertisements (104). "Advertisement" or "advertisement content" refers to information used to notify an intended audience (such as the entire viewing public or some other targeted audience) of some product, service, or feature that the author or sponsor of the advertisement wishes the intended audience to purchase, consume, or otherwise be aware of. The advertisement content is spliced into time slots in a stream of video content provided by the video content provider 100. These time slots are referred to as advertisement time slots. Advertisement time slots can have predetermined start times (such as for pre-recorded television programs). Alternatively, advertisement time slots do not have predetermined start times, but rather depend on the actual event presented by the video stream. For example, advertisement time slots for a live sports broadcast event depends on breaks during the event, such as breaks associated with time-outs, breaks between innings, etc. Also, in some scenarios, advertisement time slots may be shortened, such as due to a time-out lasting for a smaller amount of time than anticipated. In some cases, certain video content providers (such as movie channel providers) do not include advertisements during a program-instead such video content providers provide breaks between different programs, which breaks are used to present other information that can be construed as advertisements. For example, during these breaks, information about upcoming programs can be presented. These breaks between programs are thus also considered advertisement time slots.

Television content is provided in multiple television channels, with each television channel containing different television programming and associated advertisement content. More generally, the video content 104 (or other form of information content) can be considered to be provided to terminal devices in separate flows, with each flow having different content and possibly originated by a different source.

In accordance with some embodiments, a mechanism is provided to allow terminal devices to establish call sessions over the network 102 with each other during time slots in which advertisements would have been presented to a user (or users). In other words, if a particular user (or group of users) so desires, instead of watching advertisements presented during advertisement time slots, the user (or group of users) can establish call session(s) between terminal devices to allow communications between users. A "call session" refers to a telephony call session, a video conference session, a text chat session, or other types of call sessions. A call session established between terminal devices refers to a call session established between two or more terminal devices.

In one example scenario, during a sports broadcast, one user can establish a call session with another user (or other users) to discuss the sports event during advertisement time slots. In another example scenario, two users watching different broadcast television programs can still call each other during time periods of overlap of advertisement time slots. This allows users who do not wish to watch broadcast advertisements to perform other network-related tasks using their terminal devices (which time slots would otherwise have been wasted since the users who are not interested in watching the advertisements would likely ignore the advertisements). Potentially, a service provider can derive revenue from users calling each other during advertisement time slots.

The call session can communicate voice traffic only or voice plus video traffic, according to some embodiments. The video for the call session can replace entirely the advertisement content that would have otherwise been presented. Alternatively, a picture-in-picture mechanism can be provided in which the video associated with the call session is provided as a picture-in-picture so that both the call session video and the advertisement content can be displayed simultaneously.

In FIG. 1, example terminal devices include a handheld device 106 (e.g., a personal digital assistant (PDA), a mobile telephone, or a notebook computer), and customer premise equipment (CPE) 108, 110, such as set-top boxes, digital video recorders (DVRs), and so forth, for receiving the video content from the video content provider 100. Each CPE 108, 110 is connected to a respective television 109, 111 (or display device). Certain types of handheld devices 106 are able to display the video content, while other types of handheld devices are not able to display the video content provided by the video content provider 100. Another type of terminal device includes a personal computer (PC) 112 that is capable of displaying video content received from the video content provider 100.

The handheld device 106 communicates through a wireless network over a wireless link 114, where the wireless network includes an access point (AP) 116 (sometimes also referred to as a base transceiver station), a radio network controller (RNC) 118 (sometimes also referred to as a base station controller), and a system controller 120. The wireless network can be one of various different types of networks, such as a code-division multiple access (CDMA) 2000 network (e.g., a 1xRTT network, a 1xEVDO network, 802.11, WiMAX, or other type of network). Alternatively, the wireless network can be a Universal Mobile Telecommunications System (UMTS) network or an EGDE (Enhanced Data rates for GSM Evolutions) network. Examples of the system controller 120 include a packet data serving node (PDSN), a serving GPRS (General Packet Radio Service) support node (SGSN), or other nodes. The system controller 120 enables communication between wireless mobile devices (e.g., the handheld device 106) and a packet data network, such as network 102.

In some examples, the packet data network 102 is an Internet Protocol (IP) network, which provides for packet-switched communications. Versions of IP include IPv4, defined in Request for Comments (RFC) 791, entitled "Internet Protocol," dated Sep. 1981; and IPv6, described in RFC 2460, entitled "Internet Protocol, Version 6 (IPv6) Specification," dated Dec. 1998. The packet data network 102 can be made up of many network links, routers, switches, and other nodes.

The AP 116, RNC 118, system controller 120, and video content provider 100 are part of a multi-services arrangement 150 that provides multiple types of services, including video content services (e.g., television services), wireless communications services, and other types of services such as voice-over-IP services to allow voice calls over an IP network. The multi-services arrangement 150 is enclosed in a dashed box to represent that the components that are part of the multi-services arrangement 150 are logically, functionally, and/or physically related. Note, however, that the multi-services arrangement 150 can be implemented with different platforms (e.g., network nodes) distributed geographically over a large area (e.g., an entire city, state or province, country, or world).

Each of the terminal devices depicted in FIG. 1, including the handheld device 106, CPE 108, 110, and personal computer 112 is capable of establishing call sessions over the packet data network 102. In accordance with some embodiments, one protocol that allows for establishment of call sessions over the packet data network 102 is a Session Initiation Protocol (SIP). A base version of SIP is defined in RFC 3261, entitled "SIP: Session Initiation Protocol," dated Jun. 2002. Note that reference to SIP refers to either the base version of SIP, or extensions of SIP as defined by various public domain documents.

In other embodiments, other standards can be used by the terminal devices for control signaling to establish call sessions over the packet data network 102. One such other standard is the H.323 Recommendation from the International Telecommunications Union (ITU). In yet other embodiments, the network 102 can be a circuit-switched network (rather than a packet data network), or an Asynchronous Transfer Mode (ATM) network (which is a connection-oriented network).

If SIP is employed, then a SIP proxy 122 (or multiple SIP proxies 122) is (are) provided in the multi-service arrangement 150 to allow terminal devices to establish call sessions with each other using SIP. In alternative embodiments, instead of SIP proxies 122, other types of call control modules can be used for establishing call sessions over the network 102.

In accordance with some embodiments, one or plural synchronized ad time slot call managers 124 is (are) provided in the multi-services arrangement 150 to manage the establishment of call sessions between two or more terminal devices during time slots in which advertisements are to be presented by the terminal devices. Each call manager 124 has an interface (represented by the two-sided arrow) to the network 102. In an implementation with multiple call managers 124, each call manager 124 can manage a respective group of terminal devices. For example, a terminal device in one city can interact with one call manager, while another terminal device in another city can interact with another call manager. The plural call managers can communicate with each other for the purpose of establishing call sessions between terminal devices. In the ensuing discussion, reference is made to one call manager 124; however, it should be understood that the tasks of the call manager 124 can be shared among plural call managers as circumstances warrant.

The synchronized ad time slot call manager 124 determines whether advertisement content to be presented by the terminal devices at least partially overlap in time with each other. In many cases, the time slots during which advertisement content associated with different television channels (or other flows) is provided to terminal devices are at least partially synchronized with each other such that there exists at least some amount of overlap in the advertisement time slots. If two or more users are viewing the same video content (e.g., same television channel or other flow), then the overlapping time period would be a fully overlapping time period. However, even if two or more users are viewing different video content (e.g., different television channels or other flows), there usually would still be some amount of overlap of advertisement time slots. As an example, if an advertisement time slot on TV channel 1 starts at 8:24:00 (eight o'clock, 24 minutes, and zero seconds) and ends at 8:24:30, while an advertisement time slot on TV channel 5 starts at 8:24:15 and ends at 8:24:45, there will be 15 seconds of overlap between these two advertisement time slots (from 8:24:15 to 8:24:30). Therefore, viewers at the two terminal devices that are tuned to the two corresponding channels can establish a call session with each other during this 15-second time period of overlap.

The synchronized ad time slot call manager 124 is able to check for overlapping time periods during which advertisement content will be presented to the terminal devices that have expressed interest in establishing call sessions over the packet data network 102 during advertisement time slots. The call manager 124 enables interested terminal devices to establish call sessions with each other during these overlapping advertisement time periods. Call sessions can then be established during these overlapping time periods, assuming that the overlapping time periods are greater than some predetermined time interval. For example, any overlapping time period less than some predetermined amount of time (e.g., 10 seconds or less) may be deemed to be insufficient for establishing a meaningful call session.

As depicted in FIG. 1, each call manager 124 includes software 125 executable on a central processing unit (CPU) 127 to perform the various tasks of the call manager 124 described herein.

In some implementations, the call manager 124 can be the module for initiating the establishment of call sessions between the terminal devices at the appropriate times. Alternatively, a terminal device can monitor for the appropriate time to initiate a call session, in which case the terminal device initiates the call session.

As further depicted in FIG. 1, the multi-services arrangement 150 also includes a record keeping server 126 (coupled to the call manager), which is used for keeping records of each occurrence of a call session established between terminal devices. The records kept by the record keeping server 126 can be used for billing purposes (such as billing per call session, billing per minute or second, and so forth). The call manager 124 can send information about call sessions during advertisement timeslots to the record keeping server 126.

The video content provider 100 according to one example implementation includes a video content receiver 130 for receiving video content 131 from some remote source. For example, the video content receiver 130 can be a satellite dish for receiving video content from a satellite. Alternatively, the video content receiver 130 can receive the video content 131 from a land-based communications conduit.

The output (video content stream) of the video content receiver 130 is provided to one or plural splicers 132. The one or plural splicers 132 are connected to one or plural ad servers 134, which contain advertisement content and schedules for presenting the advertisement content. The advertisement content and schedules in the one or plural ad servers 134 are provided by an ad traffic and billing (T&B) system 136. In one implementation, ad sales personnel sell advertising to customers (e.g., companies wishing to advertise their products or services to the viewing public). The ad sales personnel use the T&B system 136 to manage accounts, sales, and advertisement placement schedules. The advertisement content is created and metadata information associated with the advertisement content is loaded into the T&B system 136. Metadata information refers to information that describes the advertisement content (such as information pertaining to the markets that the advertisement content is directed to, the type of advertisement content, and so forth). The advertisement content and schedules are provided by the T&B system 136 to the ad server(s) 134.

Although the components of the video content provider 100 are depicted as being part of one box (labeled 100), it is noted that the components can be distributed geographically such that there may be multiple T&B systems and multiple video content receivers along with multiple ad servers and splicers.

The splicers 132 receive cues in the video content stream provided by the video content receiver 130, where the cues indicate when advertisements are to be inserted into the broadcast. The cues received by each splicer 132 are communicated to a corresponding ad server 134 to upload advertisement content to the splicer 132 (from the ad server 134) such that the advertisement content can be spliced into the information stream that is provided over the network 102 (information stream 104 containing video content with advertisement content) to terminal devices.

The video content transmitted by the video content provider 100 over the packet data network 102 (e.g., IP network) can be according to an IPTV (IP television) technique, in which television content is communicated (in IP packets) over an IP network. Alternatively, other forms of television content can be communicated over other types of networks.

Figure 2:
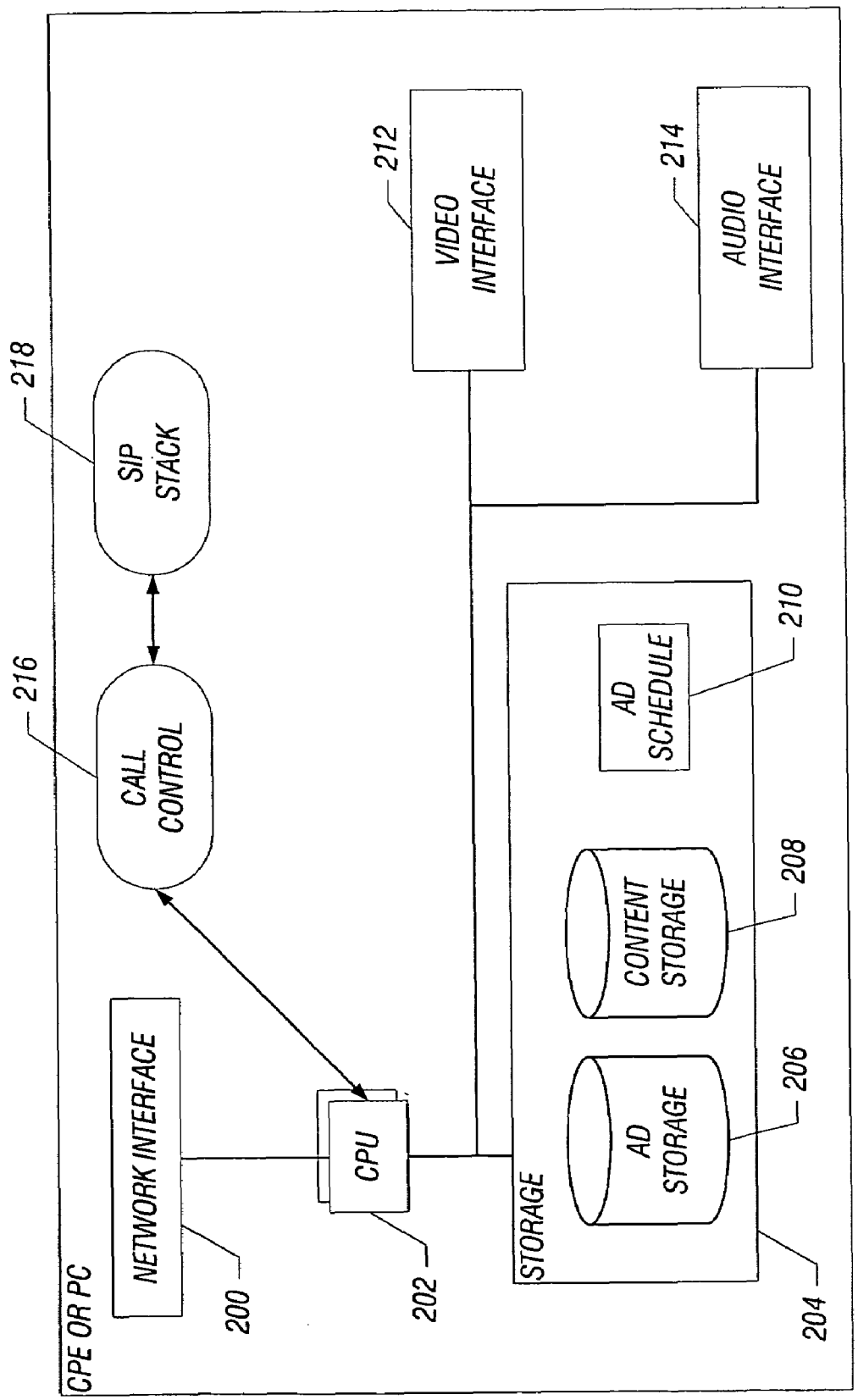
FIG. 2 is a block diagram of a customer premise equipment (CPE) or personal computer (PC), in accordance with an embodiment.

An example arrangement of a CPE or PC is illustrated in FIG. 2. Note that the arrangement of FIG. 2 is also applicable to the handheld device 106 of FIG. 1. The CPU or PC (referred to generally as a terminal device) includes a network interface 200 for communicating over a network, such as network 102 or wireless link 114 (FIG. 1). The network interface 200 includes appropriate protocol stacks (e.g., IP stack, wireless network stack, etc.) for communicating over a respective network. The network interface 200 is in turn connected to one or plural central processing units (CPUs) 202, which is (are) connected to a storage subsystem 204. The storage subsystem 204 includes an ad storage 206 for storing advertisement content, a content storage 208 for storing information content such as video content, and an ad schedule 210 that contains schedules of when advertisements are to be presented by the terminal device. Note that the ad storage 206 and content storage 208 can be omitted in other implementations, with the terminal device receiving a real-time (or substantially real-time) stream of video content from the video content provider 100 over the network 102 (or wireless link 114).

The terminal device also includes a video interface 212 for presenting video content to a display monitor, such as the display monitor of a television (e.g., 109, 111) or the display monitor of a PC. The terminal device also includes an audio interface 214 for outputting audio content to an audio output device (e.g., speaker).

The terminal device also includes a call control module 216 for establishing call sessions over the network 102. For example, the call control module 216 can send call requests to a SIP proxy 122 (FIG. 1), which SIP proxy then forwards the call request to the intended destination terminal device (or destination terminal devices). For communicating SIP call control messages, the terminal device includes a SIP stack 218. In other implementations, other call control modules are included for providing other types of call control signaling.

Figure 3:
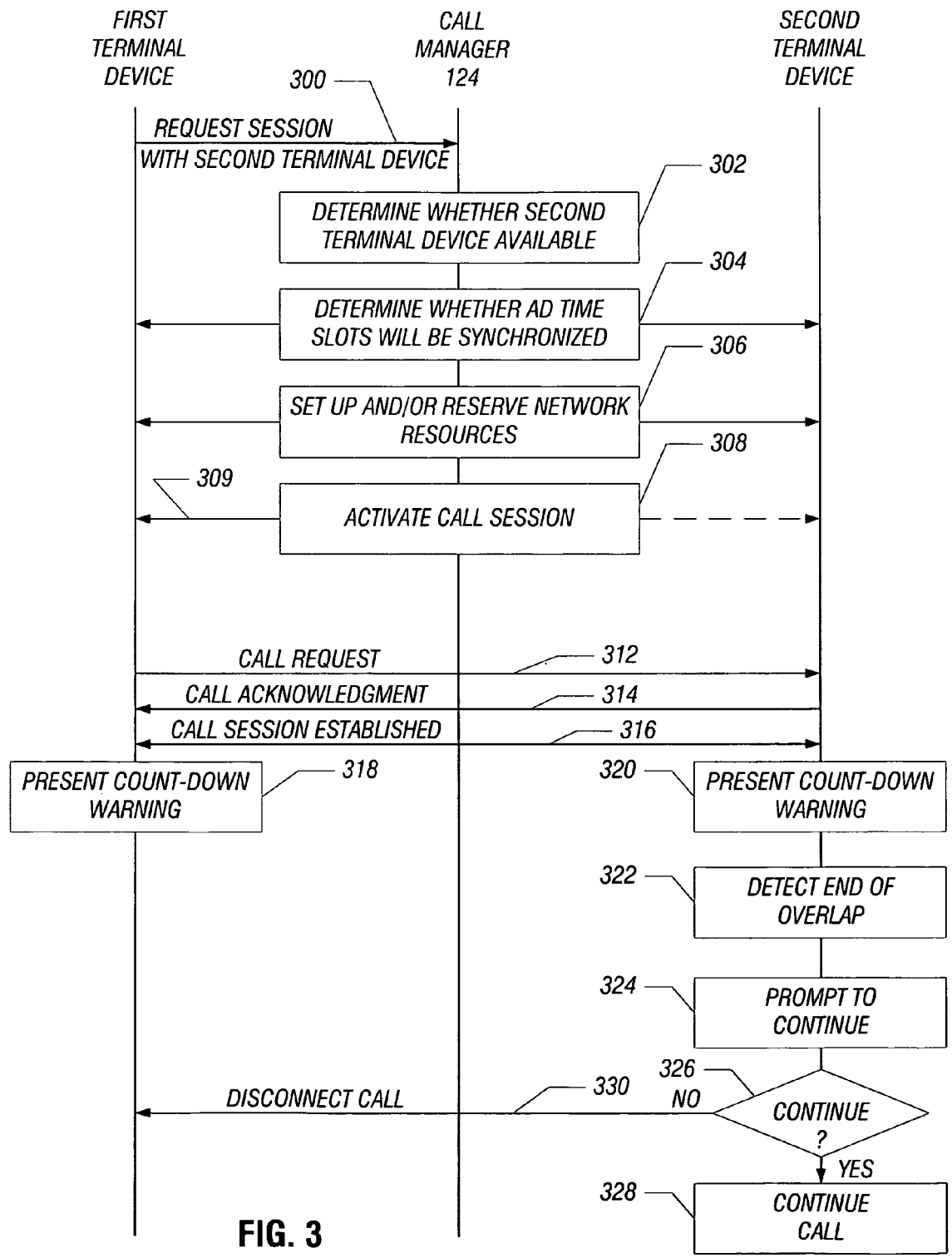
FIG. 3 is a message flow diagram to perform call session establishment between terminal devices during time periods in which advertisement content is to be provided to the terminal devices, in accordance with an embodiment.

FIG. 3 is a message flow diagram illustrating a process of establishing call sessions during overlapping time periods for advertisement content. The example illustrated in FIG. 3 involves a first terminal device, a second terminal device, and the synchronized ad time slot call manager 124. In other examples, more than two terminal devices can be involved in a multi-party call session. In the example of FIG. 3, the first terminal device is associated with a user interested in establishing call sessions during a time period corresponding to overlap of advertisement time slots with a second terminal device (and possibly with other terminal devices as well). The first terminal device sends (at 300) an indication to the call manager 124, where the indication is a request for a call session with the second terminal device (and possibly other terminal devices). The request from the first terminal device is a request expressing an interest in establishing call sessions during time slots in which advertisement content is being presented at the first and second terminal devices.

In response to this request, the call manager 124 determines (at 302) whether the second terminal device is available. For example, the second terminal device may be off or otherwise offline. In some implementations, a user or terminal device can indicate their presence or availability at a server (which can be the call manager). The user or terminal device can also indicate the best way to communicate with the user or terminal device. The call manager 124 also determines (at 304) whether the ad time slots will be synchronized between the first and second terminal devices. As depicted in FIG. 1, the call manager 124 is able to access the one or plural ad servers 134 to obtain schedules for advertisement content. The call manager 124 is also able to communicate with the first and second terminal devices to determine the video content (e.g., television channels) that the first and second terminal devices are presenting. For example, if both the first and second terminal devices are tuned to the same television channel, then the advertisement time slots will be fully synchronized. However, if the first and second terminal devices are tuned to different television channels, then the call manager 124 will have to determine from the schedules obtained from the ad server(s) 134 whether or not (and when) the advertisement time slots of the different television channels overlap. The call manager 124 also determines the amount of overlap of such advertisement time slots. If the amount of time overlap is less than some predefined threshold (e.g., 10 seconds or less), then the call manager 124 will treat such a small time overlap as being insufficient for establishing a meaningful call session between the first and second terminal devices.

In some scenarios, such as during presentations of live events (e.g., live sports events), the call manager 124 will be unable to determine from the schedules the specific start times of the advertisement time slots. In such scenarios, the call manager 124 may indicate that advertisement time slots will overlap if both the first and second terminal devices are tuned to the same live event, but indicate that the advertisement time slots will not overlap if one terminal device is tuned to the live event but another terminal device is tuned to another program.

If the call manager 124 determines that advertisement time slots will be synchronized at the first and second terminal devices (the time periods of overlap for the advertisement time slots is greater than the predefined threshold), the call manager 124 sets up and/or reserves network resources (at 306). The setup procedure and the reservation of network resources are different for different types of networks. For example, if the network is a wireless network, then the setup performed by the call manager 124 would entail requesting that radio bearer resources be allocated for the particular terminal device(s). On the other hand, setup and/or reservation of network resources can involve requesting particular qualities of service (QoS) for communication flows over an IP network to ensure that network resources are properly reserved to enable the desired call session between the first and second terminal devices.

Typically, different levels of QoS are available in an IP network. Network traffic such as electronic mail or web browsing are usually allocated a default of quality of service, which is usually the lowest level of quality of service. On the other hand, real-time communications, such as telephony communications, video conferencing, or multimedia communications between terminal devices require higher levels of QoS to ensure that excessive delays are not experienced by the terminal devices during the call session. One example protocol for requesting a specific QoS on a network is the Resource Reservation Protocol (RSVP), as described in RFC 2205, entitled "Resource Reservation Protocol (RSVP)— Version 1 Functional Specification," dated Sep. 1997. Other techniques of reserving network resources are also available, including the differentiated services (DS) technique in which a DS field in an IP packet is used for specifying a QoS level.

In one embodiment, when the call manager 124 detects that the ad time slots for the first and second terminal devices are (or will shortly be) synchronized, then the call manager 124 activates the call session (at 308). To activate the call session, the call manager 124 sends a message to the first terminal device and/or the second terminal device to cause the terminal device(s) to start the call control dialogue for establishing the call session.

The call manager 124 can wait for the beginning of the overlapping advertisement time period before activating the call session, or alternatively, the call manager 124 can begin the activation some predetermined period of time prior to the beginning of the overlapping advertisement time period. Note that activation of the call session involves the transmission and receipt of various call control requests and responses (such as the messages exchanged at 312 and 314 in FIG. 3), which may involve some time latency. To ensure that the first and second terminal devices can begin communicating voice data (and/or video data or other data) right at the start of the overlapping advertisement time period, the call manager 124 can begin the call activation ahead of time. On the other hand, if the overlapping time period is sufficiently long, then the call manager 124 can begin the call session activation at the beginning of the overlapping time period.

In the example of FIG. 3, to activate the call session, the call manager 124 sends (at 309) an activation message to the first terminal device to cause the first terminal device to send (at 312) a call request to the second terminal device. The call request (e.g., a SIP Invite request) sent from the first terminal device to the second terminal device can proceed through the SIP proxy 122 (if SIP is used) or through another call control module coupled to the network 102. In response to the call request, the second terminal device returns (at 314) a call acknowledgment (e.g., SIP OK) to the first terminal device. The call acknowledgment can also pass through the SIP proxy 122 or other similar call control module. Note that one call request and one call acknowledgment is depicted in FIG. 3 for purposes of simplification. Depending on the type of protocol used for call establishment, there may be other call control messages not depicted in FIG. 3.

Upon receipt of the call acknowledgment, a call session is established (at 316), where the first terminal device and second terminal device are able to exchange traffic data (e.g., voice data, video data, text data, etc.).

As the end of the overlapping advertisement time period approaches, each of the first and second terminal devices can also present (at 318, 320, respectively) count-down warnings that are displayed somewhere on the television monitor, PC monitor, or other appropriate display device. The count-down warning can provide an indication of the amount of time that is left for the call session. The remaining amount of time is calculated based on the amount of overlap over the time periods for advertisement content. Upon detection of the end of the overlap, the terminal device (in this example, the second terminal device) can prompt (at 324) the user whether the user wishes to continue. Note that the first terminal device can also provide a similar prompt to its user.

The terminal device then receives an indication from the user (at 326) regarding whether or not the user wishes to continue the call session past the overlapping advertisement time period. If not, a call disconnect request (e.g., SIP BYE message) is sent (at 330) to disconnect the call session. However, if the user wishes to continue, then the call is continued (at 328). The user at the first terminal device can perform similar indications of whether or not to continue a call. In some implementations, along with the countdown message, the amount of time to the next overlapping advertisement time period can also be presented to the users to help them make the decision regarding whether or not to continue the present call session.

Also, in some scenarios, there is the possibility that users may change channels while they are involved in a call session. In such a scenario, the amount of overlapping advertisement period may change and a message can be displayed accordingly to provide a warning.

In other scenarios, users can also choose to completely preempt normal programming (rather than to just extend a call session past the overlapping advertisement time period). For example, if a user determines that a synchronized time slot is a relatively long time away, then the user may choose to start the call session now rather than wait.

The procedure of FIG. 3 can be repeated during the next set of synchronized advertisement time slots or at any other time. Users do not even have to wait for advertisement time slots to initiate call sessions with each other. Any user can request call establishment even during the broadcast of a television program. This is part of the override function provided by the terminal devices to enable users to establish call sessions at any time the user wishes.

Figure 4:
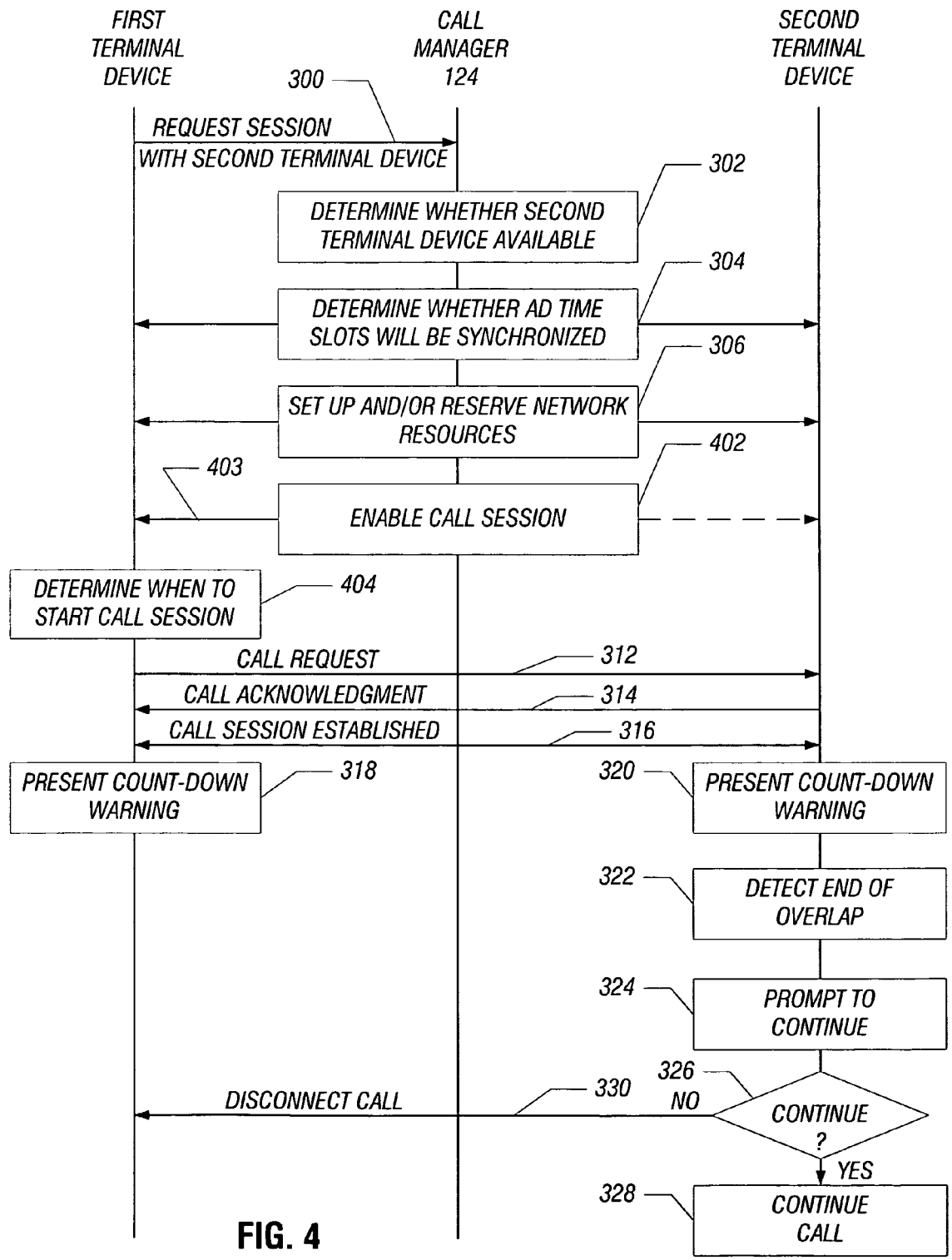
FIG. 4 is a message flow diagram to perform call session establishment between terminal devices during time periods in which advertisement content is to be provided to the terminal devices, in accordance with another embodiment.

FIG. 4 shows a slightly modified flow for establishing call sessions during advertisement time slots. The tasks that are the same as the tasks of FIG. 3 share the same reference numerals. In FIG. 4, instead of performing activation (308 in FIG. 3) of the call session by the call manager 124, the call manager 124 enables (at 402) the activation of the call session by the first terminal device. The call manager 124 performs this enabling by sending (at 403) an enabling message to the first terminal device. Note that the enabling message sent at 403 and the activation message sent at 309 (FIG. 3) can both be generically referred to as an indication for establishment of a call session.

In response to receiving the enabling message, the first terminal device determines (at 404) when to start the call session. This determination is based on detecting a start event, which can be one of several events. In one example, the call manager 124 provides a start time (one type of start event) at which the call session is to be established. This start time can be the start of the overlapping advertisement time period, or can be some predetermined small amount of time prior to the start of the overlapping advertisement time period. Alternatively, the first terminal device can detect an advertisement indicator (such as a cue provided in the stream containing video content and advertisement content), which is another type of start event.

Once the first terminal device determines that the call session is to start, the first terminal device sends the call request (at 312). The remaining tasks are the same as in FIG. 3.

In yet another alternative implementation, a peer-to-peer technique can be employed for establishing call sessions. In this alternative implementation, the call manager 124 is not involved in establishing the call session. Rather, a terminal device can detect start of advertisement content (such as based on advertisement cues) and send out a call request to another terminal device to start the call session. A user can provide some indication to the terminal device to indicate to the terminal device that it is to start detecting for such advertisement cues and to establish call sessions in response. For example, such an indication can be in the form of selecting a graphical user interface (GUI) control element or activating some other control element (such as buttons on the terminal device).

Instructions of the various software discussed herein (such as the call control module 216 in FIG. 2, software 125 in the call manager 124 in FIG. 1, and so forth) are loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to each system in one of many different ways. For example, code segments including instructions stored on floppy disks, CD or DVD media, a hard disk, or transported through a network interface card, modem, or other interface device are loaded into the device or system and executed as corresponding software routines or modules. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations there from.

It is intended that the appended claims cover such modifications and variations as fall within the true spirit and scope of the invention.

What is claimed is:

1. A method of communications between terminal devices, comprising:
   determining a time period of overlap between a first time slot of first advertisement content provided to a first terminal device and a second time slot of second advertisement content provided to a second terminal device, wherein determining the time period of overlap is performed by accessing schedules associated with the first and second advertisement content; and
   sending an indication for establishment of a call session between the first terminal device and second terminal device during the time period of overlap.

2. The method of claim 1, wherein determining the time period of overlap is performed by accessing the schedules stored in one or more ad servers.

3. The method of claim 1, wherein the determining is performed by a call manager separate from the first and second terminal devices.

4. The method of claim 1, wherein determining the time period of overlap between the first time slot of the first advertisement content and the second time slot of the second advertisement content comprises determining the time period of overlap between the first and second time slots of first and second advertisement content contained in respective first and second information content to be presented by the respective first and second terminal devices.

5. The method of claim 1, wherein sending the indication for establishment of the call session comprises sending the indication for establishment of the call session in which traffic relating to the call session is presented by the first and second terminal devices instead of respective first and second advertisement content during the call session.

6. The method of claim 1, wherein sending the indication for establishment of the call session comprises sending the indication for establishment of the call session containing voice traffic over an Internet Protocol network.

7. The method of claim 1, further comprising receiving a request from at least one of the first and second terminal devices expressing an interest in establishing the call session during advertisement time slots,
   wherein the determining and sending acts are performed in response to receiving the request.

8. A method of communications between terminal devices, comprising:
   determining a time period of overlap between a first time slot of first advertisement content provided to a first terminal device and a second time slot of second advertisement content provided to a second terminal device; and
   sending an indication for establishment of a call session between the first terminal device and second terminal device during the time period of overlap,
   wherein sending the indication comprises one of:
   sending a first message to one of the first terminal device and second terminal device to cause the one of the first terminal device and second terminal device to transmit a call request for establishing the call session; and
   sending a second message to one of the first terminal device and second terminal device to enable the one of the first terminal device and second terminal device to start establishing the call session in response to detecting a start event.

9. The method of claim 8, wherein sending the first message causes the one of the first terminal device and second terminal device to send a Session Initiation Protocol (SIP) Invite request.

10. A method of communications between terminal devices, comprising:
    determining a time period of overlap between a first time slot of first advertisement content provided to a first terminal device and a second time slot of second advertisement content provided to a second terminal device; and
    sending an indication for establishment of a call session between the first terminal device and second terminal device during the time period of overlap,
    wherein determining the time period of overlap between the first time slot of the first advertisement content and the second time slot of the second advertisement content comprises determining the time period of overlap between the first and second time slots of first and second advertisement content contained in respective first and second television channels.

11. A method of communications between terminal devices, comprising:
    determining a time period of overlap between a first time slot of first advertisement content provided to a first terminal device and a second time slot of second advertisement content provided to a second terminal device;
    sending an indication for establishment of a call session between the first terminal device and second terminal device during the time period of overlap; and
    determining whether the time period of overlap is greater than a predetermined interval,
    wherein sending the indication is in response to determining that the time period of overlap is greater than the predetermined interval.

12. The method of claim 11, further comprising disabling sending of the indication in response to determining that the time period of overlap is not greater than the predetermined interval.

13. An article comprising at least one storage medium containing instructions that when executed cause a first terminal device to:
    receive an indication that a call session with at least a second terminal device is to be established during a time period of overlap between a first advertisement time slot and at least a second advertisement time slot;
    based on the indication, send a call request to establish the call session;
    establish the call session according to the call request, wherein traffic associated with the call session is presented to the first terminal device and at least the second terminal device during the call session in place of or in addition to advertisement content; and
    in response to detecting an end of the time period of overlap, present a prompt to a user to ask whether the user desires to continue the call session past the time period of overlap.

14. The article of claim 13, wherein the instructions when executed cause the first terminal device to further receive first information content, wherein the first information content contains advertisement content in the first advertisement time slot, and wherein the second time slot is for advertisement content contained in second information content presented to the second terminal device.

15. The article of claim 14, wherein receiving the first information content comprises receiving video content.

16. The article of claim 14, wherein receiving the first information content comprises receiving Internet Protocol television content.

17. A system comprising:

an interface to a network; and a controller to:

receive a request from at least a first terminal device expressing an interest regarding establishment of a call session between the first terminal device and at least one other terminal device during an overlapping time period of advertisement time slots of information content presented to the respective terminal devices;

in response to the request, determine whether the overlapping time period exists, wherein the overlapping time period is determined based on accessing at least one schedule associated with advertisement content; and in response to determining that the overlapping time period exists, send an indication for establishment of the call session between the terminal devices during the overlapping time period.

18. The system of claim 17, the controller to further send information regarding the call session to a recordkeeping server to enable billing for the call session.

* * * * *

UNITED STATES PATENT AND TRADEMARK OFFICE
CERTIFICATE OF CORRECTION

PATENT NO. : 7,620,390 B2
APPLICATION NO. : 11/438565
DATED : November 17, 2009
INVENTOR(S) : Vezza et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 654 days.

Signed and Sealed this

Twenty-sixth Day of October, 2010

David J. Kappos
*Director of the United States Patent and Trademark Office*